US010647004B2

(12) United States Patent
Hawkes et al.

(10) Patent No.: US 10,647,004 B2
(45) Date of Patent: May 12, 2020

(54) AIR-BLADDER ENHANCED WITH GECKO-ADHESIVE FOR GRASPING APPLICATIONS

(71) Applicant: The Board of Trustees of the Leland Stanford Junior University, Stanford, CA (US)

(72) Inventors: Elliot W. Hawkes, Santa Barbara, CA (US); David L. Christensen, Glendale, CA (US); Mark R. Cutkosky, Palo Alto, CA (US); Srinivasan Arul Suresh, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/315,724

(22) PCT Filed: Jul. 7, 2017

(86) PCT No.: PCT/US2017/041035
§ 371 (c)(1),
(2) Date: Jan. 7, 2019

(87) PCT Pub. No.: WO2018/009754
PCT Pub. Date: Jan. 11, 2018

(65) Prior Publication Data
US 2019/0176342 A1    Jun. 13, 2019

Related U.S. Application Data

(60) Provisional application No. 62/365,204, filed on Jul. 21, 2016, provisional application No. 62/359,362, filed on Jul. 7, 2016.

(51) Int. Cl.
*B25J 15/00* (2006.01)
*C09J 7/00* (2018.01)

(52) U.S. Cl.
CPC ......... *B25J 15/008* (2013.01); *B25J 15/0023* (2013.01); *B25J 15/0085* (2013.01); *C09J 7/00* (2013.01); *C09J 2201/626* (2013.01)

(58) Field of Classification Search
CPC .. B25J 15/008; B25J 15/0085; B25J 15/0023; B25J 15/12; B25J 7/00; C09J 7/00; C09J 2201/626; Y10S 294/902
(Continued)

(56) References Cited

U.S. PATENT DOCUMENTS 3,343,864 A * 9/1967 Baer .................... B25J 15/0009
294/119.3
3,675,962 A * 7/1972 Simpson .............. B25J 15/0023
294/99.1
(Continued)

FOREIGN PATENT DOCUMENTS

CN       105364936      2/2016
DE       102012001095   7/2013
(Continued)

*Primary Examiner* — Dean J Kramer
(74) *Attorney, Agent, or Firm* — Lumen Patent Firm

(57) ABSTRACT

The present invention provides a shear gripper device using fibrillar, gecko-inspired adhesives that have the characteristics of being non-tacky in its default state and requiring no normal force to grip a surface. The adhesion is turned "on" by the applied shear load, and "off" as the shear load is removed. The shear adhesive gripper is able to grasp large, deformable or delicate objects using a delicate touch.

12 Claims, 10 Drawing Sheets

(58) Field of Classification Search
USPC .......................................................... 294/86.4
See application file for complete search history.

(56) References Cited

U.S. PATENT DOCUMENTS

| | | | | |
|---|---|---|---|---|
| 7,762,362 | B2* | 7/2010 | Cutkosky | B62D 57/024 |
| | | | | 180/8.1 |
| 9,067,324 | B2* | 6/2015 | Matsuoka | B25J 15/0023 |
| 2006/0033350 | A1* | 2/2006 | Besch | B25B 5/065 |
| | | | | 294/119.3 |
| 2014/0227473 | A1* | 8/2014 | Parness | B32B 7/12 |
| | | | | 428/64.1 |
| 2014/0272272 | A1* | 9/2014 | Spenko | C09J 9/00 |
| | | | | 428/113 |
| 2015/0090113 | A1* | 4/2015 | Galloway | B25J 9/142 |
| | | | | 92/48 |
| 2015/0375404 | A1* | 12/2015 | Matsuoka | B25J 15/0023 |
| | | | | 294/86.4 |
| 2016/0200946 | A1 | 7/2016 | Hawkes | |

FOREIGN PATENT DOCUMENTS

| | | |
|---|---|---|
| DE | 102014205988 | 10/2015 |
| WO | WO2012093932 | 7/2012 |
| WO | WO2015179501 | 11/2015 |

* cited by examiner

AIR-BLADDER ENHANCED WITH GECKO-ADHESIVE FOR GRASPING APPLICATIONS

CROSS-REFERENCE TO RELATED APPLICATIONS

This application is a 371 of PCT application PCT/US2017/041035 filed on Jul. 7, 2017. PCT application PCT/US2017/041035 claims the benefit of U.S. Provisional application 62/359,362 filed on Jul. 7, 2016 and U.S. Provisional application 62/365,204 filed on Jul. 21, 2016.

FIELD OF THE INVENTION

This invention relates to grasping devices, methods and systems.

BACKGROUND OF THE INVENTION

Traditional grasping uses normal forces to hold objects. If an object is small relative to the gripper, the gripper wraps around the object and applies normal forces to support it (form closure). For larger objects, the gripper squeezes the object and creates friction to the hold it (force closure).

Often, both direct support and friction hold the object. While friction is very useful for grasping objects, it has two drawbacks: the squeezing normal force can crush delicate or deformable objects, and the normal force tends to push objects out of the grasp in the case where the gripper cannot reach at least halfway around the object. Examples of such grippers are numerous, including rigid and fully actuated ones, as well as more compliant, under-actuated and back drivable grippers.

There exist a number of alternatives to traditional grippers. Vacuum is often used in manufacturing for lifting non-porous objects without readily graspable features. Vacuum can be combined with particle jamming and friction to grasp a variety of objects. A tacky mushroom-tipped adhesive can be used to lift objects once it is pressed onto the surface, and is able to lift over 0.4 N at≈2 kPa. These examples use primarily a normal force that is directed away from the object to lift it. Electrostatic adhesion requires much less pressing force to engage but provides limited adhesion that would require a very large piece and additional control infrastructures for large load applications.

In contrast to both traditional grippers as well as the above mentioned alternative grippers, the present invention advances the art by providing grippers based on shear adhesion, or adhesion that is tangent to a surface.

SUMMARY OF THE INVENTION

The present invention provides a shear gripper device using fibrillar, gecko-inspired adhesives that have the characteristics of being non-tacky in its default state and requiring no normal force to grip a surface. The adhesion is turned "on" by the applied shear load, and "off" as the shear load is removed. The shear adhesive gripper is able to grasp large, deformable or delicate objects using a delicate touch.

In one example, the shear gripper device distinguishes a first gripper and an opposing second gripper. The first and second gripper are spaced from each other to allow the positioning of an object in between the first and second gripper. A mechanism is being used to manipulate the relative position between the first gripper and the second gripper relative to the object. Examples of such mechanism to manipulate the relative position between the first gripper and the second gripper relative to the object are ones based on an electrostatic mechanism operable on the first and second gripper, based on a pneumatic mechanism operable on an inflated bladder of the first and second gripper, or a electromechanical motor mechanism.

Both the first and second gripper have the following structural configuration:
(i) a backing structure with a layer-facing surface; and
(ii) a layer of directional dry adhesives having a backing-facing surface and an object-facing surface. The object-facing surface distinguishes a plurality of stalks, wherein the backing-facing surface rests on the layer-facing surface of the backing structure. The layer of directional dry adhesives of the first gripper opposes and faces the layer of directional dry adhesives of the second gripper.

When mechanism causes the first and second gripper to close in onto the object, the compliance of the first and second gripper is designed to conform the first and the second gripper to the surface of the object. The compliance of the first and second gripper ranges from 1.0E7 to 2.5E9.

Each of the layers of directional dry adhesives then sits in between their backing structures and the object. The compliance of the plurality of stalks of the first and second gripper allow them to deform when in contact with the object. The shear forces applied by the plurality of stalks of the first and second gripper onto the surface of the object causes the shear gripper device to support the weight of the object while the object is being manipulated. The effective modulus of the plurality of stalks ranges from $10^3$ to $10^6$ Pa.

In one example, the backing structure of the first and second gripper is an inflated bladder. In case of using an inflated bladder, the pressure applied by each one of the first and second grippers onto the object when conformed to the object ranges from 100 Pa to 10 kPa.

In an alternate embodiment, the shear gripper device is a single shear gripper device whereby the first and second gripper form one single gripper. The single gripper has a lamp-like shape that is square, rectangular, circular or cylindrical.

BRIEF DESCRIPTION OF THE DRAWINGS

FIG. 8A shows two flexible adhesives hang from a frame by linear bearings. FIG. 8B shows the flexible adhesives brought close to the surface of an object, and then when the electroadhesion is turned on, the adhesive will be brought into contact with the surface. At this point, the object can be lifted (FIG. 8C). When the electroadhesion is turned off, the object can be released.

DETAILED DESCRIPTION

Shear Adhesion Grasping Concept

In this invention, we propose a new concept for grasping based on shear adhesion, that retains many of the desirable properties of friction grasping, yet avoids some of the downsides (Parness A, Soto D, Esparza N, Grayish N, Wilkinson M, Autumn K, Cutkosky M. A microfabricated wedge-shaped adhesive array displaying gecko-like dynamic adhesion, directionality and long lifetime. Journal of the Royal Society Interface. 2009 Jan. 1: sif-2009). Shear adhesion produced from silicone microwedges can reach 80% of maximum in only 68 ms. Because it is not made from a tacky material, the adhesive does not easily accumulate dirt and dust. Finally, the adhesion is controllable, not by applying a normal force as in the case of friction, but rather by applying the same shear load that is needed to lift the object (FIGS. 1A-D. This is the chief advantage of shear adhesive grasping: applying a load in the direction required for lifting an object turns the grip on, and removing this load turns it off. The manufacturing process can be found in Day et al. 2013 (Day P, Eason E V, Esparza N, Christensen D, Cutkosky M. Microwedge machining for the manufacture of directional dry adhesives. Journal of Micro and Nano-Manufacturing, 2013 Mar. 1; 1(1):011001.)

Figure 1A:
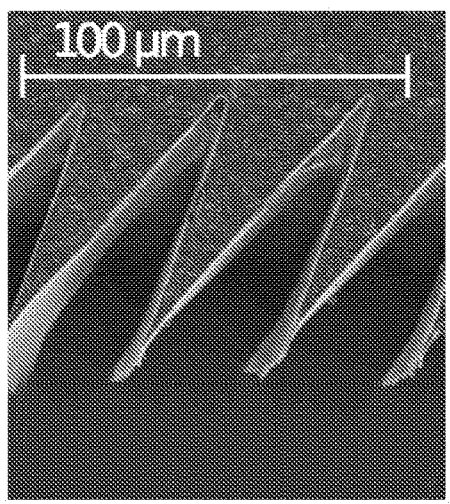
FIGS. 1A-D show according to an exemplary embodiment of the invention in FIG. 1A an image of the microwedge adhesives, in FIG. 1B the tips of the microwedge adhesive self-engage with a surface when brought in contact, in FIG. 1C when loaded in shear, the wedges lay over, and a large real area of contact produces adhesion, in FIG. 1D when the shear load is relaxed, the stored elastic energy in the wedges lifts them from the surface, allowing them to be removed easily.
Figure 1B:
Figure 1C:
Figure 1D:
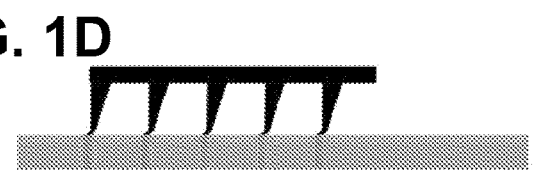
Figure 2A:
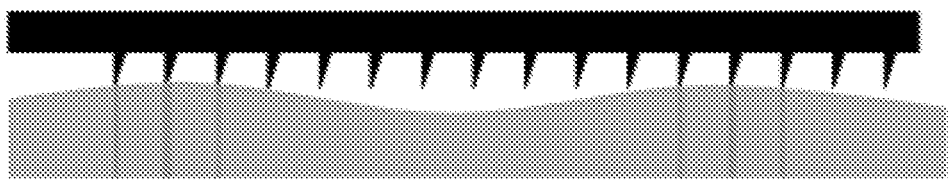
FIGS. 2A-C show according to an exemplary embodiment of the invention in FIG. 2A on a wavy surface, the tips of the microwedge adhesive self-engage only at the highest points, in FIG. 2B when loaded in shear, the wedges lay over, pulling more wedges into contact, and in FIG. 2C more shear increases this effect.
Figure 2B:
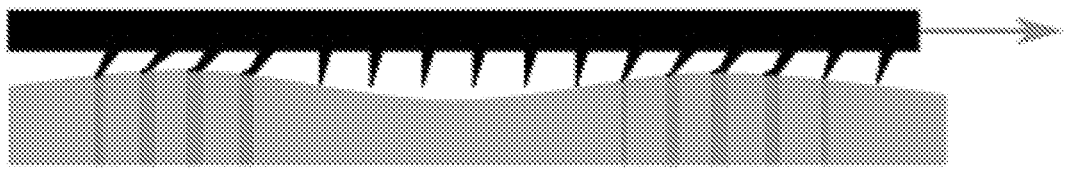
Figure 2C:
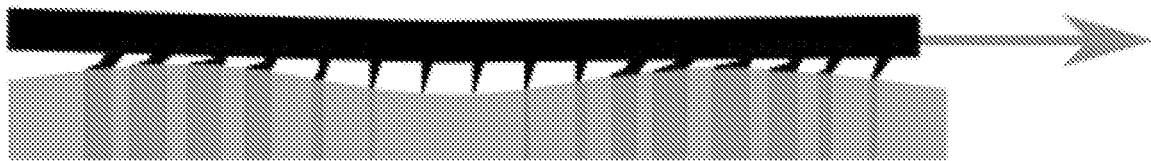

The mechanics of the microwedge adhesive employed allow the application of shear load to increase grip even on a wavy surface (FIGS. 2A-C). A few wedges will self-engage with the high points of the surface when brought in contact. As the shear load is increased, these wedges will lay over, bringing their neighbors closer to the surface. More wedges will engage, and the effect propagates.

Lateral Shear Adhesion Gripper

In general, previous gripper designs focus on the problem of grasping a convex object. While many everyday objects fall into this category (especially in the application of pick-and-place in manufacturing or packaging), the eventual goal of this invention is to lift any object that a human hand can lift. To create a gripper capable of grasping an object of a more arbitrary shape, we first note that if the object has concavity, we cannot guarantee the film will lay flat against it. We therefore may need a small amount of force to hold the adhesive on the surface. Second, we note that it is only the component of the shear in the vertical direction that lifts the object. Therefore, if we may attain only a limited area of contact, it is best for this area to have a tangent in the vertical direction. With these considerations in mind, we present the lateral shear adhesion gripper (FIGS. 3A-E).

We implement a very compliant air bladder behind each adhesive film, to help guarantee the film makes contact with the surface, despite irregularities. We also align the adhesive films vertically to maximize their contribution to the lifting force. Grasping is achieved by closing the gripper around an object, with just enough preload to deform the bladder (FIG. 3B). When lifting, the tension in the film applies a shear load through the adhesive.

Figure 3A:
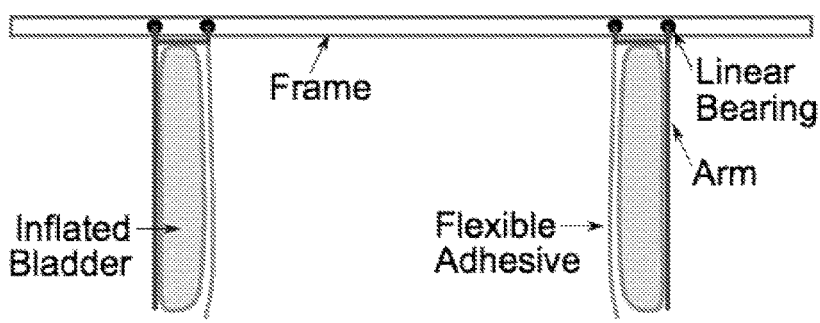
FIGS. 3A-E show according to an exemplary embodiment of the invention in FIG. 3A the lateral shear adhesion gripper having two arms, i.e. first and second gripper, extending perpendicularly from the frame. The two grippers move on a linear bearing along the frame. Each gripper has an inflated bladder, with a thin film of adhesive resting on the inner surface, in FIG. 3B the two grippers are brought in to close around an object of arbitrary shape, in FIG. 3C the frame is lifted, and shear force from the adhesive lifts the object, in FIG. 3D an alternative version of the gripper device with a single pivot joint, and in FIG. 3E the gripper opens as the first and second gripper pivot away from one another.
Figure 3B:
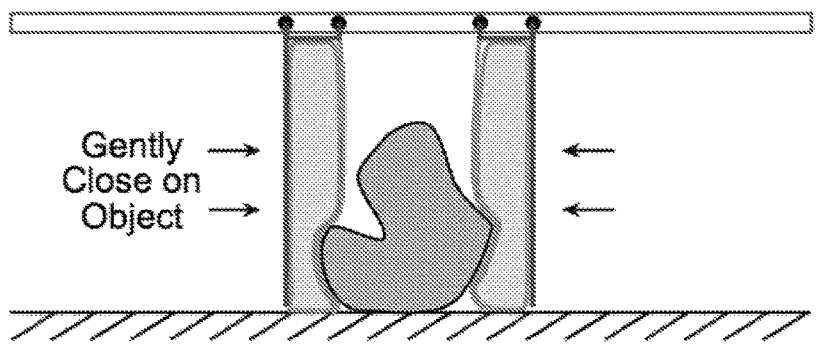
Figure 3C:
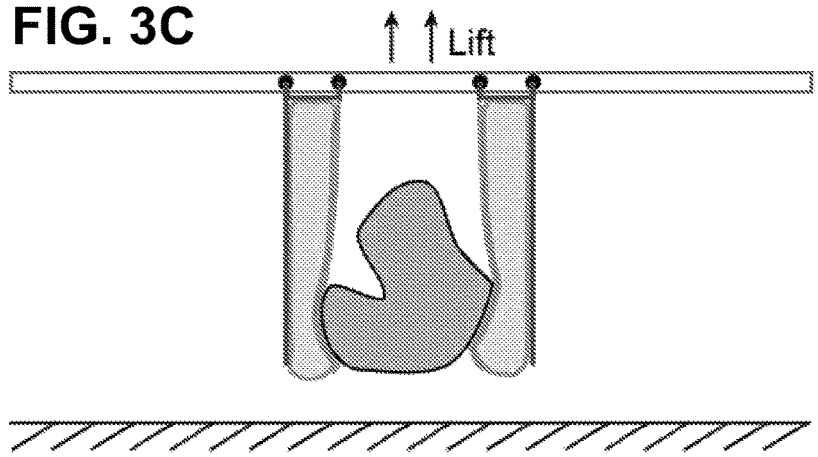
Figure 3D:
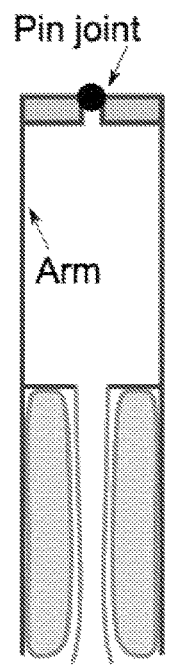
Figure 3E:
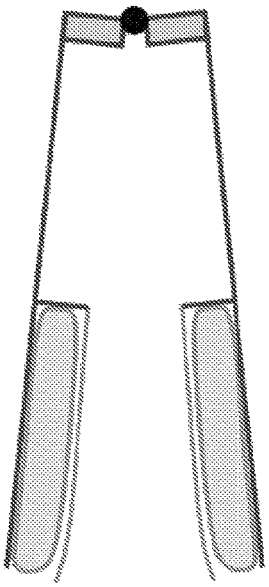

FIG. 3A shows a lateral shear adhesion gripper with two arms extending perpendicularly from the frame. In one example, the two arms move on a linear bearing along the frame. On each arm is an inflated bladder, with a thin film of adhesive resting on the inner surface. In FIG. 3B, the two arms are brought in to close around an object of arbitrary shape. The frame is lifted, and shear force from the adhesive lifts the object (FIG. 3C). FIG. 3D shows an alternative version of the gripper with a single pivot joint. The gripper opens as the two arms pivot away from one another (FIG. 3E).

The critical difference between this gripper and previous soft robotic grippers that use friction is that here the lifting force is not dependent on grasping force. This is important for two reasons. First, it eliminates the need for sensing and controlling the gripping force, because a single, predefined very light preload can be used regardless of object size, weight, or fragility. Second, soft grippers based on friction cannot easily lift heavy objects because a large normal force cannot be produced with a very compliant gripper, whereas this gripper is capable of lifting objects with a mass of over 3 kilograms.

Lateral Shear Adhesion Gripper: Its Working

Figure 4:
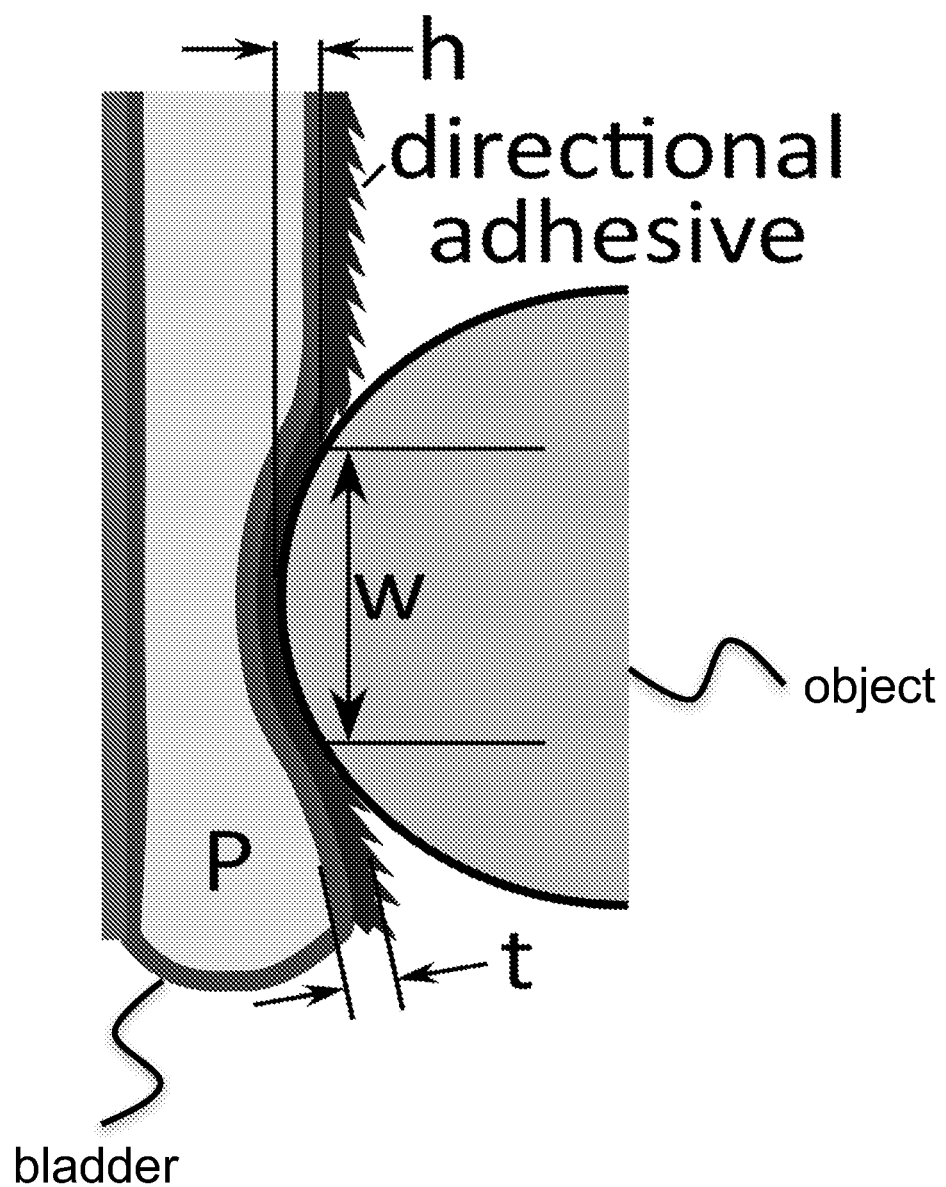
FIG. 4 shows according to an exemplary embodiment of the invention a model of an aspect of the grasping device.

FIG. 4 shows exemplary measurements for the grasping device. Specifically, the physics of the working of the device can be understood as follows:

$$h = \frac{3}{16} \frac{\left(\frac{w}{2}\right)^4 P}{t^3 E} (1-v)(7+3v) \tag{1}$$

which defines $c_{min}$, as $$c_{min} = \frac{1}{t^3 E} \propto \frac{h}{P\left(\frac{w}{2}\right)^4} \tag{2}$$

where
- h is a height of the peak of the contact patch of a convex object,
- w is the width of the contact patch of a convex object,
- P is the pressure behind the conforming material,
- t is a thickness of the conforming material,
- E is a modulus of elasticity of the conforming material, and
- v is Poisson's ratio for the conforming material.

For a small, highly curved object with a smooth surface (h=0.02 m, P=1000 Pa, w=0.02 m), a high compliance is needed: c=2.5E9.

For a larger, less curved, rougher object (h=0.005 m, P=10000 Pa, w=0.1 m), a much smaller compliance is needed: c=1.0E7.

Therefore the range of compliance needed is from c=1.0E7 to 2.5E9.

The amount of preload force, $F_{preload}$, is defined as:

$$F_{preload} = AP \tag{3}$$

where
A is the area of the stiff backing behind the bladder with pressure P.

The magnitude of P depends on the surface being grasped. For smooth surfaces, such as glass, P can be as low as 100 Pa, and for rough surfaces, such as paper, needs to be as high as 10 kPa. Therefore, the range for P is 100 Pa to 10 kPa.

Lateral Shear Adhesion Gripper Model: Lifting Capacity

In this section, we present a model to predict the lifting capacity for the lateral shear adhesion gripper. The model assumes that the shape and surface characteristics of the object to be grasped are known. We assume the shear adhesive force is proportional to the area in contact when the gripper is under load. Also, normal adhesion is considered to be small, as is any normal compressive force due to the curvature of the film.

Figure 5:
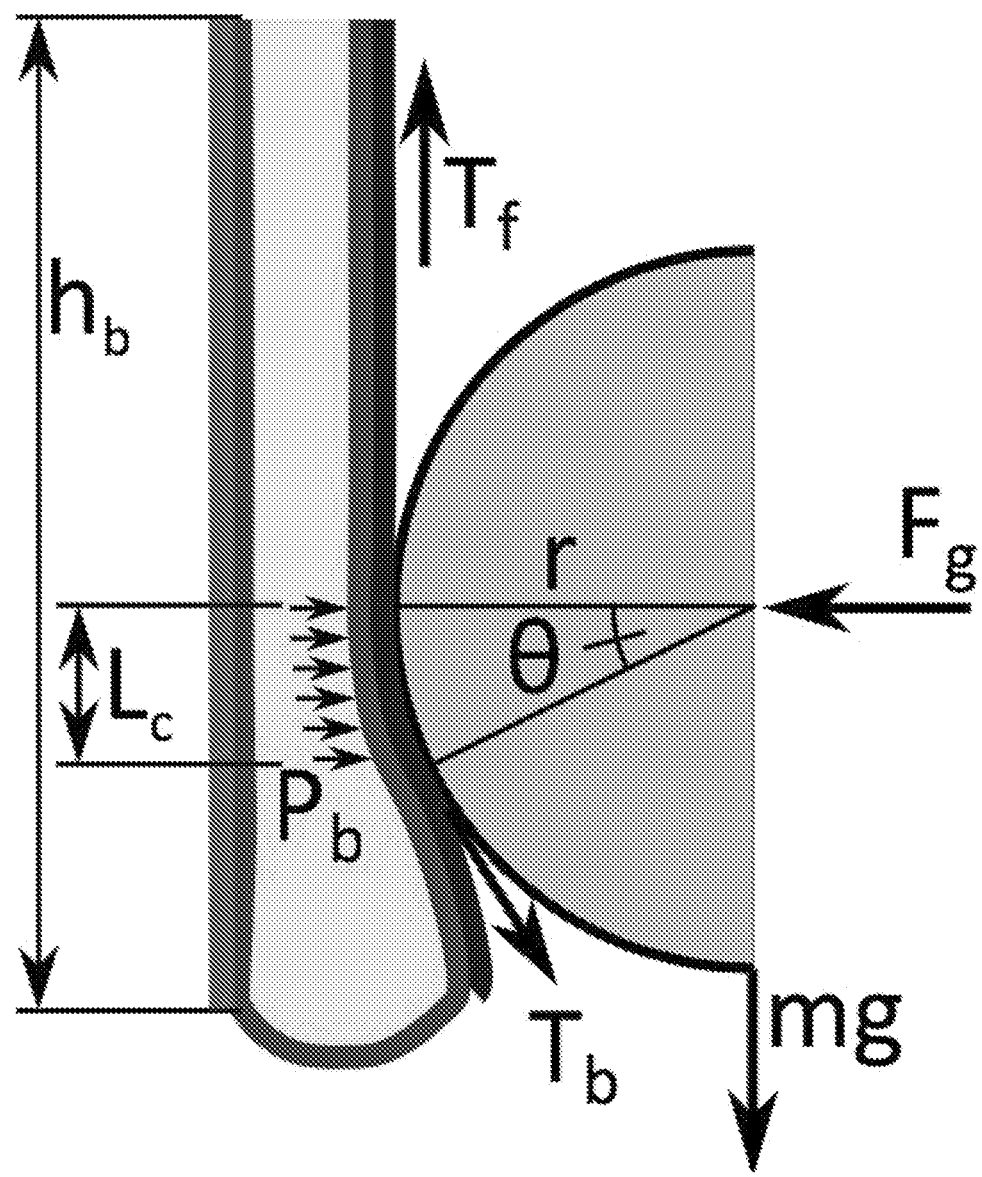
FIG. 5 shows according to an exemplary embodiment of the invention another model of an aspect of the grasping device. Here we show the force balance used for determining area of adhesive film in contact with an object in the lateral shear adhesion gripper model.

To build a model with these assumptions, we only need to determine the amount of area the film has in contact with a given object. Because the film is assumed to extend vertically from the object (FIG. 3B, 3C), all of the tension in the film is due to the weight of the object. This is in contrast to a curved surface gripper to model, in which there is a horizontal component of tension that is internal. To determine the area of film in contact with a convex object, we use a force balance, as shown in the FIG. 5. The force applied to the object by one side of the gripper, $F_g$, must balance the force that the bladder applies to the object. This force has two components: the pressure in the bladder, $P_b$, multiplied by the area of adhesive in contact, $A_a$, and the horizontal component of the tension in the bladder wall, $T_b$. The area of the adhesive, $A_a$, can be written as $L_c W$, where $L_c$ is the length of the adhesive contact, and W is the width of the gripper, measured into the page. We then write $$F_g = P_b L_c W + 2TW \sin\theta. \tag{4}$$

For small angles, $\sin\theta \approx L_c/2r$ the tension in the bladder wall is related to the pressure and the height of the bladder, $h_b$:

$$h_b P_b = T_b + F_g/W. \tag{5}$$

The shear load, $F_s$, is $$F_s = \sigma_s A_a. \tag{6}$$

Rearranging Eqs. 4 and 5, we obtain $$F_s = \sigma_s W \frac{F_g r}{P_b W r + P_b h_b W - F_g}. \tag{7}$$

We can now predict the weight of a cylindrical object that the lateral shear gripper can lift, assuming we know the geometry of the object and the adhesive shear capabilities.

Lateral Shear Adhesion Gripper Model Results

Figure 6:
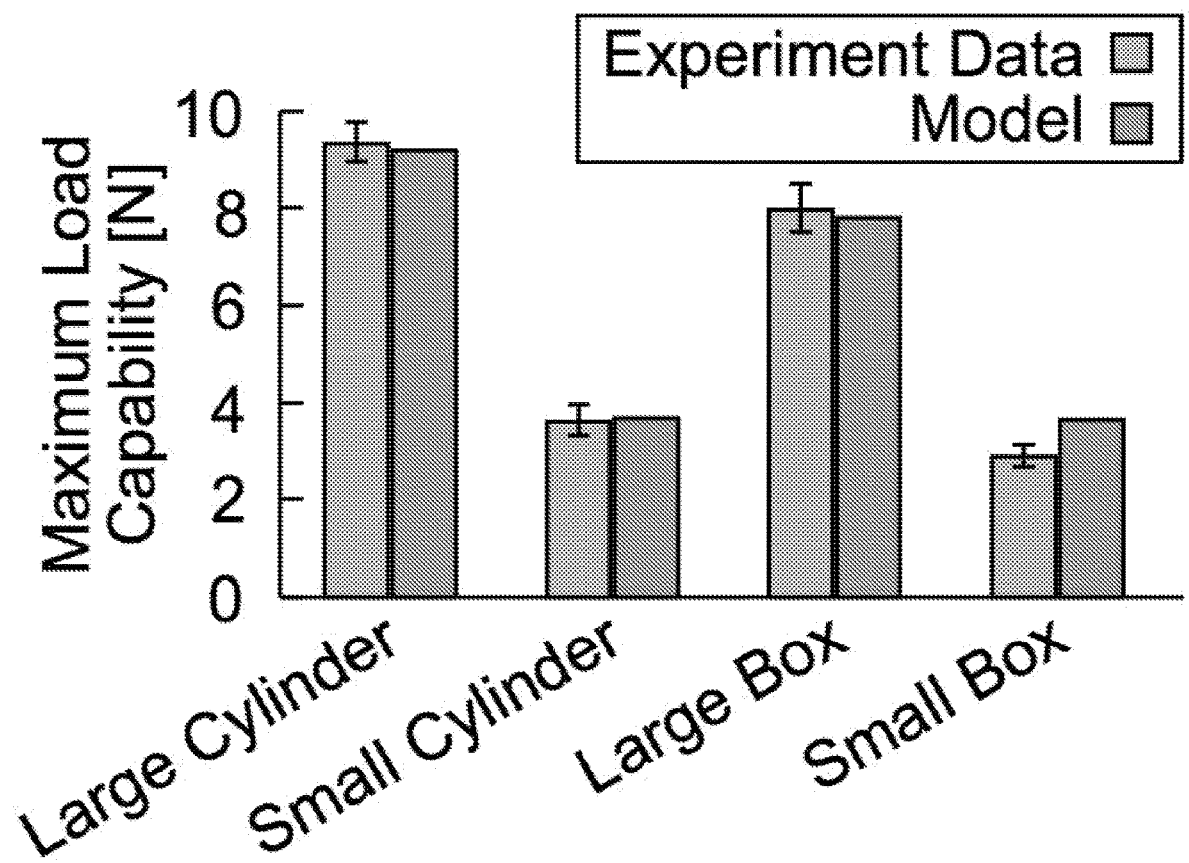
FIG. 6 shows according to an exemplary embodiment of the invention measured and predicted (Eq. 7) maximum load capability for the lateral shear adhesion gripper on various shapes.

We tested the maximum load the shear adhesion gripper could apply to four different objects: a cylinder with radius 5.7 cm, a cylinder with radius 1.7 cm, a rectangular prism with square cross section and side length 4 cm, and a rectangular prism with square cross section and side length 1.9 cm. All surfaces were covered in paper to give a uniform texture, resulting in a shear adhesive stress, $\sigma_s$, of roughly 2.3 kPa. The gripper had a width, W, of 8.5 cm, a preload, $F_g$, of 0.75N, a bladder height, $h_b$, of 15 cm, and an internal pressure, $P_b$, of 0.145 kPa. Each object was tested at five times. The results of the tests as well the predicted performance from the model (Eq. 7) are shown in FIG. 6. Larger objects are predicted to have higher maximum loads because more surface area is in contact with the adhesive.

Lateral Shear Adhesion Gripper Grasping Tasks

To test the lateral shear adhesion gripper in a practical setting, we picked up twenty-three objects of various shapes, sizes, textures, and weights selected from an online distributor and placed them into a cardboard box. The objects included a shower pouf, a 1 kg bag of chia seeds, a basketball net, a triangular box, and a bottle of chocolate syrup. This task is shown in the attached video. Further, we tested the gripper with objects that are difficult for traditional grippers such as parallel jaw grippers. We were able to grasp large and small items, ranging from 1 m to 1 mm in diameter, as well as heavy (3.4 kg) to delicate. No modifications were made to the gripper. In all cases, the preload arose only from the weight of the arms. No sensing or active grasp control was required.

Shape of Device

Figure 7:
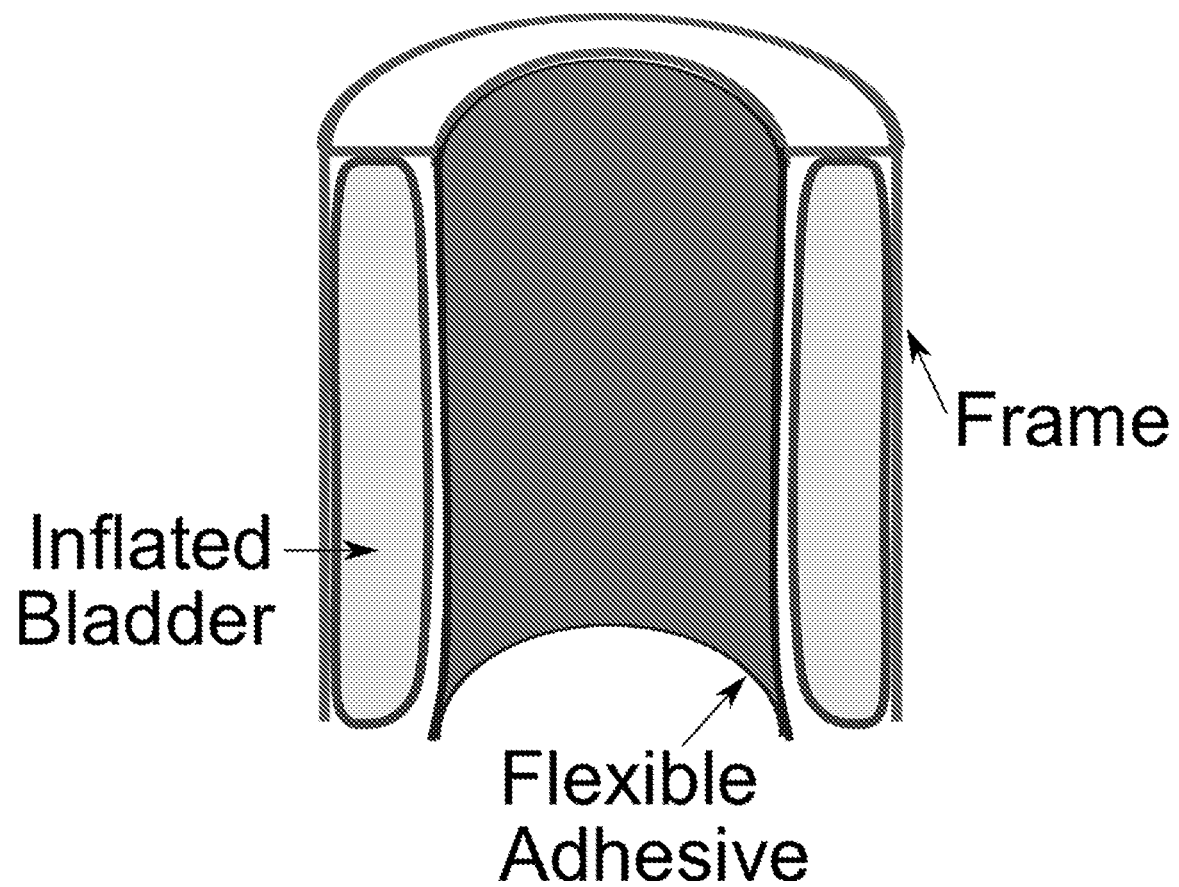
FIG. 7 shows according to an exemplary embodiment of the invention an alternate device where the shear gripper device is now a single shear gripper device. For example, the first and second gripper form one single gripper. Such single gripper could have a lamp-like shape that is square, rectangular, circular or cylindrical.

In an alternative embodiment within the same spirit of the invention one could imagine the first and second gripper forming one single gripper that can placed over the object (FIG. 7). The single gripper could be a lamp-like shape that is square, rectangular, circular or cylindrical.

Compliant Backing

Equivalent to an air-bladder any structure capable of being a compliant backing that gently conforms the adhesive film around an object can be used such as a particle-filled bladder or even foam.

Grasping Device Using Electrostatic and Controllable Adhesion

Figure 8A:
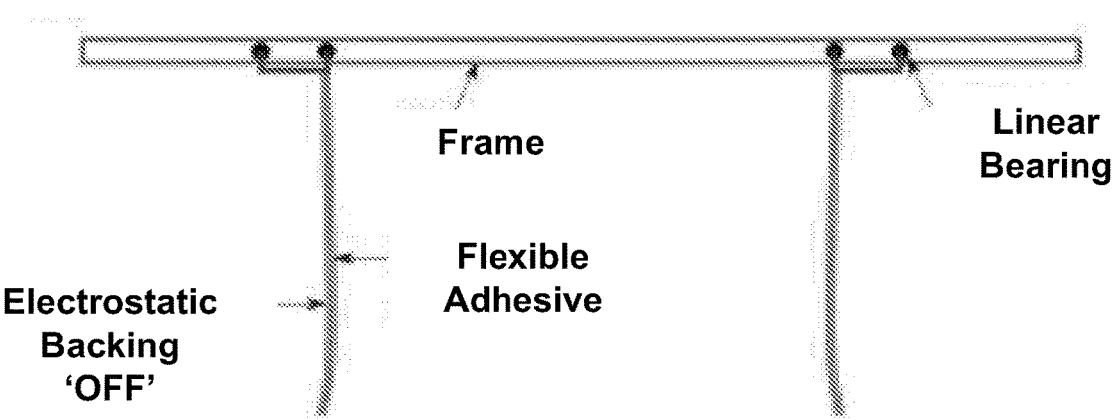
FIGS. 8A-C show according to an exemplary alternate embodiment of the invention an alternative embodiment where the device has a flexible, controllable, dry adhesive that can be drawn to surfaces using electrostatic adhesion.
Figure 8B:
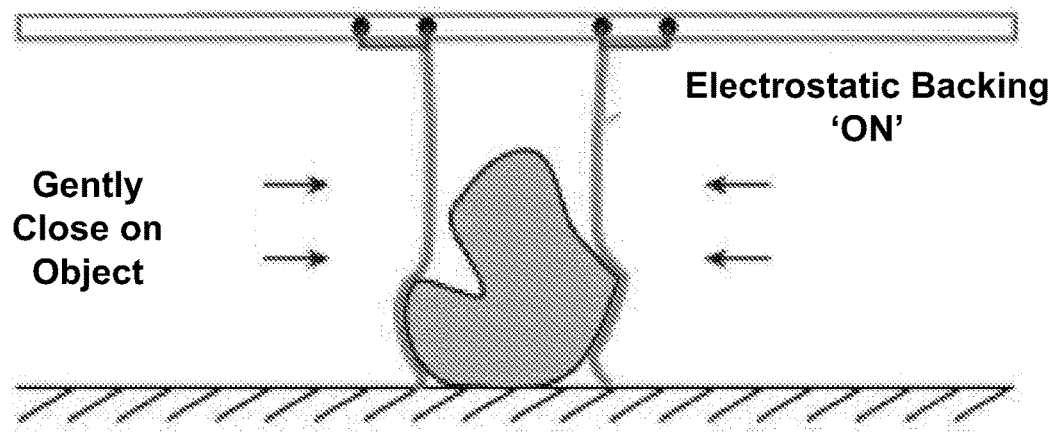
Figure 8C:
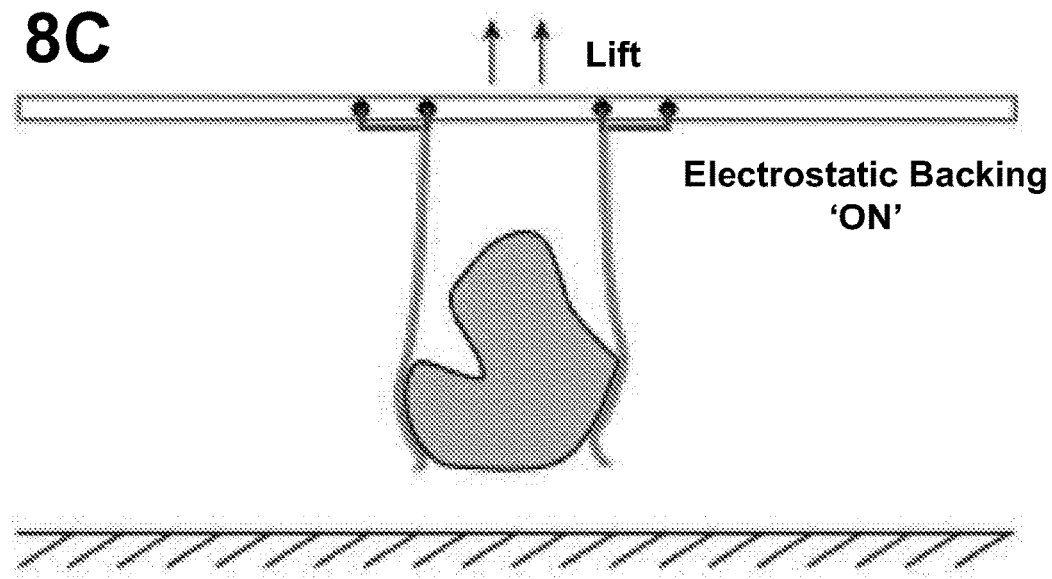

In an alternative embodiment, we present a device that is capable of lifting objects of various size, shape, weight, and surface textures. The device has a flexible, controllable, dry adhesive that can be drawn to surfaces using electrostatic adhesion. In one example of the device, shown in FIGS. 8A-C, two flexible adhesives hang from a frame by linear bearings (FIG. 8A). The flexible adhesives can be brought close to the surface of an object, then when the electroadhesion is turned on, the adhesive will be brought into contact with the surface (FIG. 8B). At this point, the object can be lifted (FIG. 8C). When the electroadhesion is turned off, the object can be released.

Figure 9:
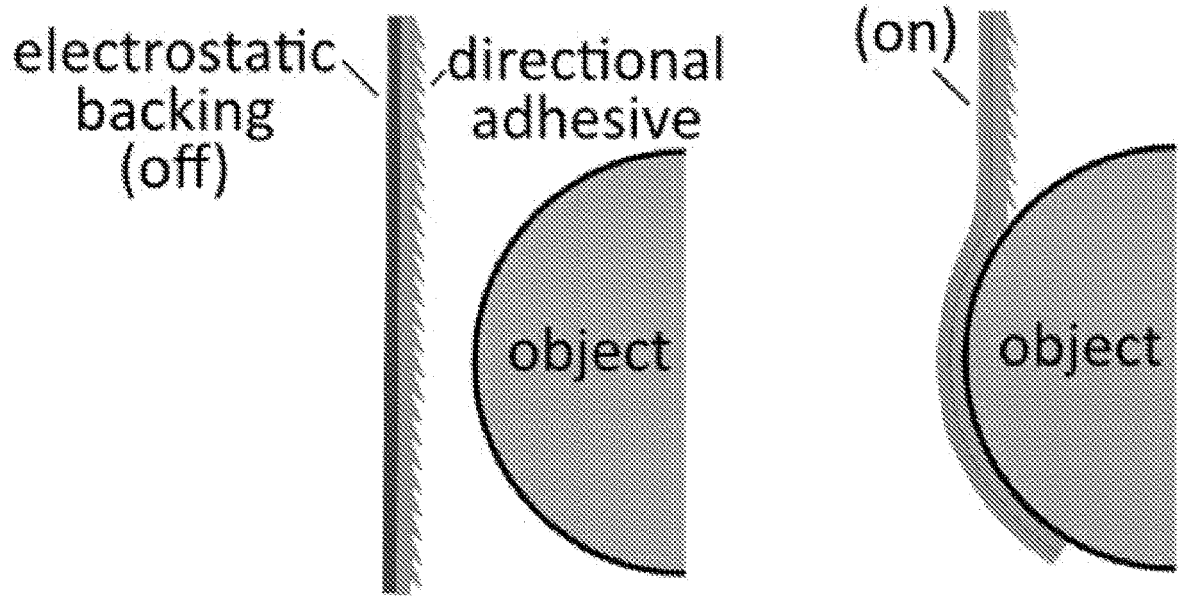
FIG. 9 shows according to an exemplary alternate embodiment of the invention details of an adhesive backed with electroadhesive conforming to and lifting an object (only half of the gripper device is shown).
Figure 10:
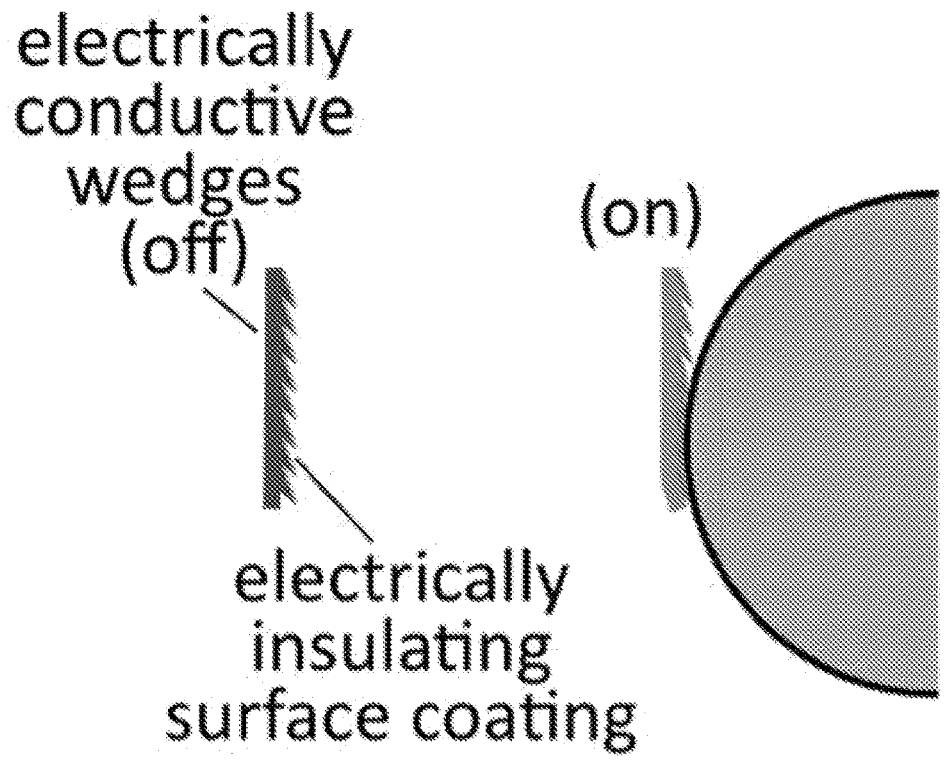
FIG. 10 shows according to an exemplary alternate embodiment of the invention electrically conductive wedges with electrically insulating surface coating.

FIG. 9 shows details of an adhesive backed with electroadhesive conforming to and lifting an object (only half of gripper is shown). The electroadhesive layer can be behind the adhesive, as shown in FIG. 9. Alternatively, the adhesive wedges themselves can be made electrically conductive, and be charged (FIG. 10). FIG. 10 shows electrically conductive wedges with electrically insulating surface coating.

Figure 11:
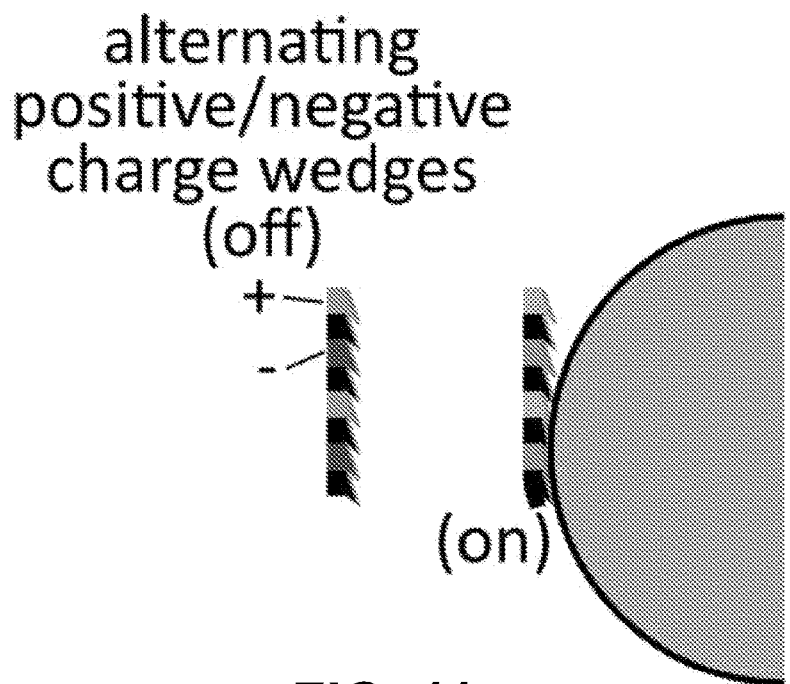
FIG. 11 shows according to an exemplary alternate embodiment of the invention where the wedges can be cast with conductive material in every other wedge.

When charged, the wedges will be attracted to the surface. A thin layer of non-conducting material is cast onto the wedges to allow the electroadhesive attraction to take effect. Finally, wedges can be cast with conductive material in every other wedge (FIG. 11). Then every other conductive wedge could be electrically connected, and a pattern of alternating charge (i.e. alternating positive and negative charge) could be put on the adhesive.

Grasping Device Using Directional Flaps

Figure 12:
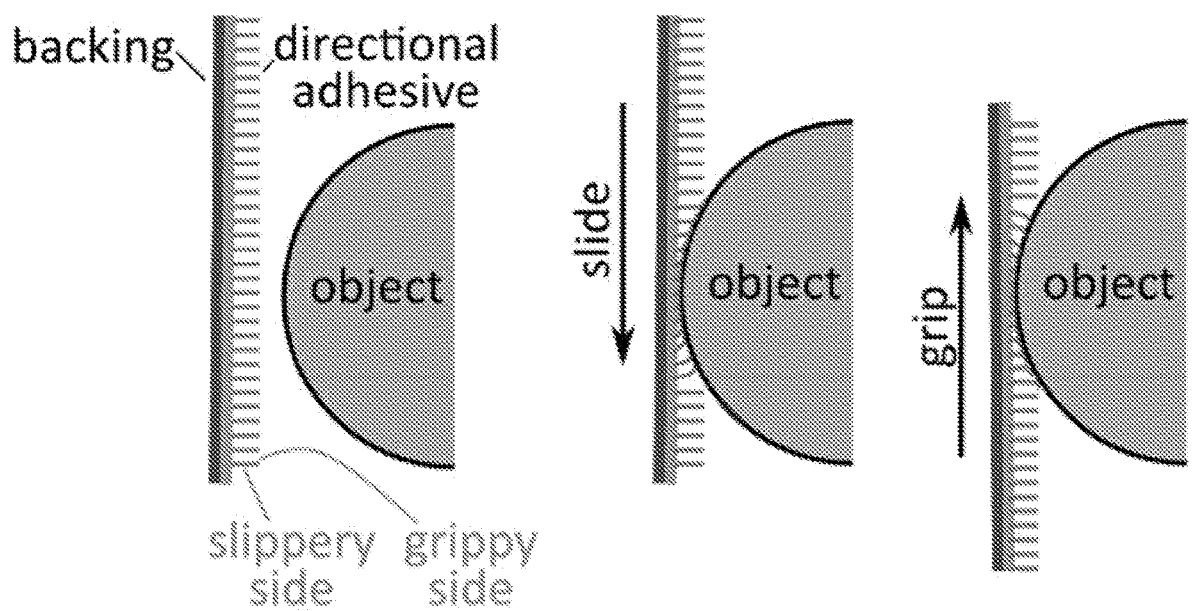
FIG. 12 shows according to an exemplary embodiment of the invention an alternative to microwedges, where larger flaps can be used to grasp in shear. These flaps can be made with a grippy side and a slippery side.

As another alternative to microwedges, larger flaps can be used to grasp in shear (FIG. 12). These flaps can be made with a grippy side and a slippery side, so that the gripper can simply slide along an object in one direction, yet grip in the other direction. This allows grasping in very tight spaces. The backing can be rigid, because the flaps are able to conform to the shape of the object.

What is claimed is:

1. A shear gripper device, comprising:
  (a) a first gripper and an opposing second gripper, wherein the first and second gripper are spaced from each other to allow the positioning of an object in between the first and second gripper;
  (b) a mechanism to manipulate the relative position between the first gripper and the second gripper relative to the object,
  wherein both the first and second gripper comprise:
  (i) an inflated backing structure with a layer-facing surface, wherein the inflated backing structure has the capability to deform to the shape of the object, and wherein the inflated backing structure is a pre-loaded inflated bladder, wherein the pre-loaded inflated bladder is pre-loaded prior to engagement with the object; and
  (ii) a layer of directional dry adhesives having a backing-facing surface and an object-facing surface, wherein the object-facing surface distinguishes a plurality of stalks, wherein the backing-facing surface rests on the layer-facing surface of the backing structure, and wherein the layer of directional dry adhesives of the first gripper opposes and faces the layer of directional dry adhesives of the second gripper,
  wherein when the mechanism causes the first and second gripper to close in onto the object, the compliance of the first and second gripper is designed to conform the first and the second gripper to the surface of the object, whereby each of the layers of directional dry adhesives sits in between their backing structures and the object,
  wherein the compliance of the plurality of stalks of the first and second gripper allow them to deform when in contact with the object, and
  wherein the shear forces applied by the plurality of stalks of the first and second gripper onto the surface of the object causes the shear gripper device to support the weight of the object while the object is being manipulated.

2. The device as set forth in claim 1, wherein the compliance of the first and second gripper ranges from 1.0E7 to 2.5E9.

3. The device as set forth in claim 1, wherein the effective modulus of the plurality of stalks ranges from $10^3$ to $10^6$ Pa.

4. The device as set forth in claim 1, wherein the inflated backing structure of the first and second gripper is an inflated bladder.

5. The device as set forth in claim 1, wherein the pressure applied by each one of the first and second grippers onto the object when conformed to the object ranges from 100 Pa to 10 kPa.

6. The device as set forth in claim 1, wherein the mechanism to manipulate the relative position between the first gripper and the second gripper relative to the object is based on an electrostatic mechanism operable on the first and second gripper, based on a pneumatic mechanism operable on the inflated backing structure of the first and second gripper, or an electromechanical motor mechanism.

7. A shear gripper device, comprising:
  (a) a first gripper and an opposing second gripper, wherein the first and second gripper are spaced from each other to allow the positioning of an object in between the first and second gripper;
  (b) a mechanism to manipulate the relative position between the first gripper and the second gripper relative to the object,
  wherein both the first and second gripper comprise:
  (i) an inflated backing structure with a layer-facing surface, wherein the inflated backing structure has the capability to deform to the shape of the object, and wherein the inflated backing structure is a pneumatically pre-loaded inflated backing structure; and
  (ii) a layer of directional dry adhesives having a backing-facing surface and an object-facing surface, wherein the object-facing surface distinguishes a plurality of stalks, wherein the backing-facing surface rests on the layer-facing surface of the backing structure, and wherein the layer of directional dry adhesives of the first gripper opposes and faces the layer of directional dry adhesives of the second gripper,
  wherein when the mechanism causes the first and second gripper to close in onto the object, the compliance of the first and second gripper is designed to conform the first and the second gripper to the surface of the object, whereby each of the layers of directional dry adhesives sits in between their backing structures and the object, wherein the compliance of the plurality of stalks of the first and second gripper allow them to deform when in contact with the object, and wherein the shear forces applied by the plurality of stalks of the first and second gripper onto the surface of the object causes the shear gripper device to support the weight of the object while the object is being manipulated.

8. The device as set forth in claim 7, wherein the compliance of the first and second gripper ranges from 1.0E7 to 2.5E9.

9. The device as set forth in claim 7, wherein the effective modulus of the plurality of stalks ranges from $10^3$ to $10^6$ Pa.

10. The device as set forth in claim 7, wherein the inflated backing structure of the first and second gripper is an inflated bladder.

11. The device as set forth in claim 7, wherein the pressure applied by each one of the first and second grippers onto the object when conformed to the object ranges from 100 Pa to 10 kPa.

12. The device as set forth in claim 7, wherein the mechanism to manipulate the relative position between the first gripper and the second gripper relative to the object is based on an electrostatic mechanism operable on the first and second gripper, based on a pneumatic mechanism operable on the inflated backing structure of the first and second gripper, or an electromechanical motor mechanism.

* * * * *